H. R. TRAPHAGEN.
RAKING DEVICE.
APPLICATION FILED JAN. 19, 1920.
1,358,481. Patented Nov. 9, 1920.
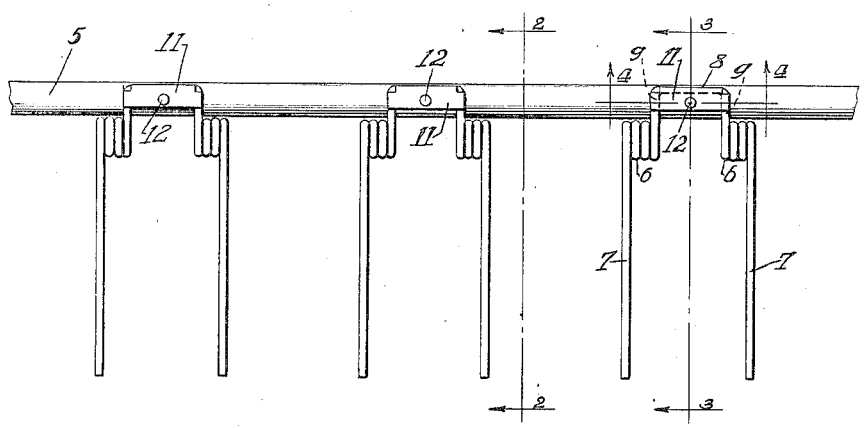
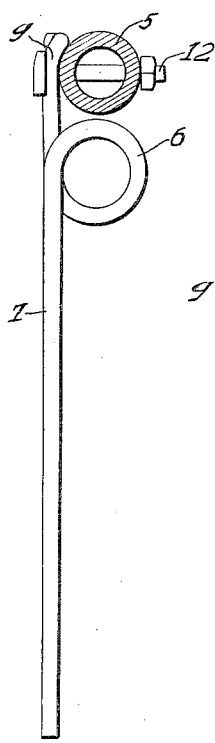
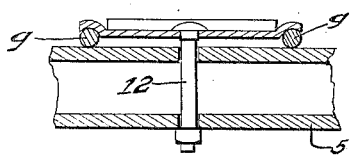
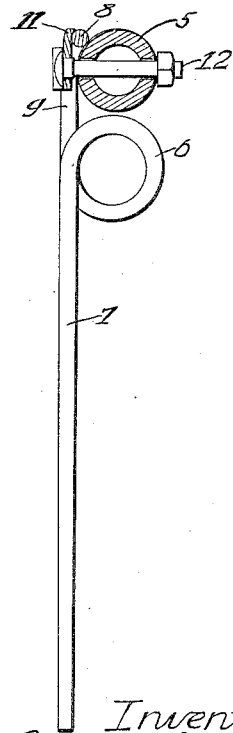
Inventor
Harry R. Traphagen
By Ira J. Wilson
Atty.

UNITED STATES PATENT OFFICE.

HARRY R. TRAPHAGEN, OF ROCKFORD, ILLINOIS, ASSIGNOR TO EMERSON-BRANTINGHAM COMPANY, OF ROCKFORD, ILLINOIS, A CORPORATION OF ILLINOIS.

RAKING DEVICE.

1,358,481.

Specification of Letters Patent.

Patented Nov. 9, 1920.

Application filed January 19, 1920. Serial No. 352,289.

*To all whom it may concern:*

Be it known that I, HARRY R. TRAPHAGEN, a citizen of the United States, residing at Rockford, in the county of Winnebago and State of Illinois, have invented certain new and useful Improvements in Raking Devices, of which the following is a specification.

This invention pertains in general to devices for handling hay, and has more particular reference to improvements in rake teeth, especially adapted for use in hay rakes and tedders of the cylinder type, such as exemplified in Patent No. 1,072,677. In hay rakes of this and other types including relatively long rake bars, such for example as are positioned about the periphery of a rake cylinder parallel with the axis thereof, it is now common practice to mount the rake teeth on these bars with the spring coils of the teeth encircling their respective rake bars. This construction necessitates passing a rake tooth lengthwise over a rake bar, or rather, stringing the teeth on a bar. It follows, therefore, that in case any rake tooth is injured or broken during use, as frequently occurs when the rake is drawn over unseen obstructions, or for other reasons, it becomes necessary to remove one or more rake teeth. This can be done only by removing all of the rake teeth from one end or the other of the rake bar at the side of the injured tooth in order to remove the latter. This obviously necessitates either removal or detachment of the rake bar and other parts and requires considerable time and trouble for making a comparatively simple repair.

The primary object of the present invention is to remedy the above condition by the provision of a rake tooth and attaching means therefor of simple and novel construction, whereby any rake tooth may be quickly and easily removed independently of the others and repaired or replaced by a new one, as occasion requires.

Another object is to provide a rake tooth structure of the character described, which shall be capable of embodiment in a form giving the desired resiliency and serving practically and effectually the purposes desired and which is of such simple construction as to enable production at a comparatively low cost.

In furtherance of these general objects, my invention contemplates, generally stated, the provision of a double-tine rake tooth formed preferably of a single length of wire, bent medially to provide a spring coil for each tine and an intermediate shank adapted to be clamped and rigidly secured to a rake bar by means of a clamping block. It will be observed that the coils do not embrace the rake bar, but that the rake tooth is secured to the bar through the agency of a clamping block, the loosening or removal of which permits quick detachment of the rake tooth separately from and independently of any other rake tooth.

Referring to the drawing,—

Figure 1 is an elevation of a conventional rake bar equipped with a plurality of rake teeth according to the invention;

Figs. 2 and 3, enlarged cross-sectional views taken on the section lines 2—2 and 3—3, respectively, of Fig. 1; and Fig. 4, a detail sectional view taken on the line 4—4 of Fig. 1.

The rake bar 5 may be of any suitable or preferred construction with regard to cross-sectional shape, and in the present instance I have illustrated a rake bar of conventional design, viz., of tubular form. Rake bars of this kind are arranged transversely about the periphery of a hay gathering or raking cylinder, the rake bars in fact constituting the frame work at the periphery of the cylinder and being mounted at their ends to suitable end plates or castings, according to the particular nature and design of the raking device. In some instances, mechanism is provided for oscillating the rake bars upon which the rake teeth are mounted at longitudinally spaced intervals, although this feature has no bearing on the present invention.

This invention contemplates primarily, the provision of what might be termed "quick detachable rake teeth". So far as I am aware, rake teeth heretofore provided in the class to which this invention relates, have not been quick detachable in the sense contemplated herein, but instead, the spring coils of the teeth have embraced the rake bar so that removal and replacement of any rake tooth, necessitated sliding the tooth lengthwise on the bar and a similar action of other rake teeth positioned on the bar at the outer side of the one desired to be moved. This difficulty I overcome by the provision of a rake tooth which is thoroughly practical and serviceable and embodied in a very simple construction which permits manufacture at a low cost. I prefer that the rake tooth shall be of the double tine type, and that each tooth shall be formed of a single piece of wire or wire rod. I have accordingly illustrated but a single embodiment in which a single length of wire is shaped medially to provide a pair of co-axial coils 6, axially spaced, the outer end 7 of each coil terminating in a tine and the inner end extending from the coil in the opposite direction from the tine and providing an attaching shank. This shank, being the portion intermediate the coils 6, is preferably of general U shape as shown, comprising the cross portion 8 and sides 9, the latter of which is slightly curved to fit the periphery of the rake bar. A clamping block, designated generally by character 11, is now provided, being shaped to fittingly engage the end 8 and sides 9 of the rake tooth, and this block is adapted to be rigidly clamped to the rake bar by means of a single bolt 12, as plainly shown in the drawing. It will be manifest that a clamping block 11 rigidly secures the rake tooth to the rake bar and that by loosening the bolt or removing it, if desired, the rake tooth may be instantly detached for any purpose. Thus, any pair of rake teeth may be easily and quickly removed independently and without disturbing the others. By reason of this construction, the rake tooth is rigidly and substantially secured to the rake bar and the function of the coils is in no way interfered with as is often the case where these coils tightly embrace the rake bar. It will be evident that by use of my improvements considerable time and expense are saved both in assembling hay rakes of this type and in repairing them when it is necessary to remove any of the rake teeth.

It is believed that the foregoing conveys a clear understanding of my improvements, and while I have illustrated and described but a single working embodiment thereof, it should be manifest that various changes might be made in details of construction without departing from the spirit and scope of the invention as expressed in the appended claims, in which—

I claim:

1. In a device of the character described, the combination of a rake bar, rake teeth attached to the bar at longitudinally spaced intervals thereon, each pair of rake teeth being formed of a single length of wire rod shaped medially to provide a spring coil for each end or tine and to further form a shank intermediate said coils, and a clamping bolt for securing said shank to the bar with the spring coils wholly at one side thereof so as to permit quick detachment of the rake teeth.

2. In a device of the character described, the combination of a rake bar, a pair of rake teeth formed of a single length of wire, bent medially to provide a pair of co-axial spring coils in axially spaced relation, the ends of the coils terminating in rake teeth extending to one side in parallel relation, and the intermediate portion of the wire between the coils extending to the opposite side of the coils from the rake teeth and terminating in a transverse medial portion, said intermediate portion constituting a supporting shank, and means for detachably connecting said shank to said rake bar with the spring coils at one side of the rake bar, whereby the rake teeth may be quickly detached from or mounted upon the rake bar.

3. In a device of the character described, the combination of a rake bar, a pair of co-axial coils each terminating at its outer end in a rake tine and having its inner end extending from the coil in the opposite direction from that of its tine and bent laterally forming an elbow shank, said coils being positioned at one side only of the rake bar with said shanks in juxtaposition to the bar, and a clamping block for rigidly securing said shanks to the rake bar but permitting quick detachment therefrom.

4. In a device of the character described, a rake bar, a pair of rake teeth formed of a single piece of wire rod to provide a pair of spring coils each terminating at its end in a rake tine and the portion intermediate the coils constituting a shank of U-shape adapted to be positioned in juxtaposition to said bar with the coils wholly at one side thereof, a clamping block engaging the cross portion and sides of said shank, and a bolt passing through the clamping block intermediate said sides of the shank for rigidly securing the rake teeth to the bar and permitting quick detachment therefrom.

HARRY R. TRAPHAGEN.